July 15, 1958 — L. G. PONCE — 2,843,017
REAR VIEW MIRROR ASSEMBLY
Filed Dec. 7, 1954 — 2 Sheets-Sheet 1
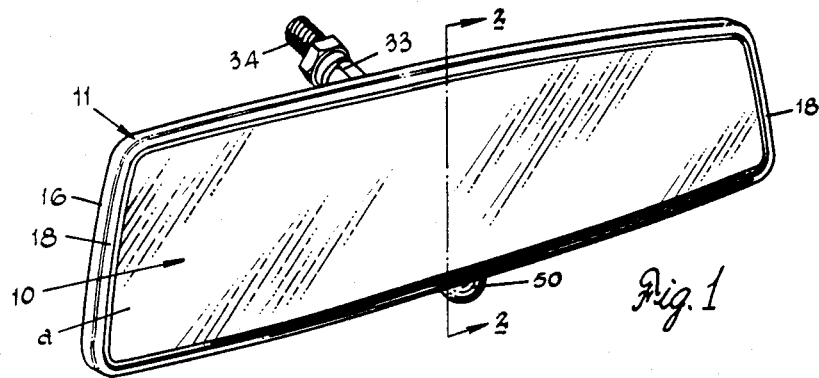
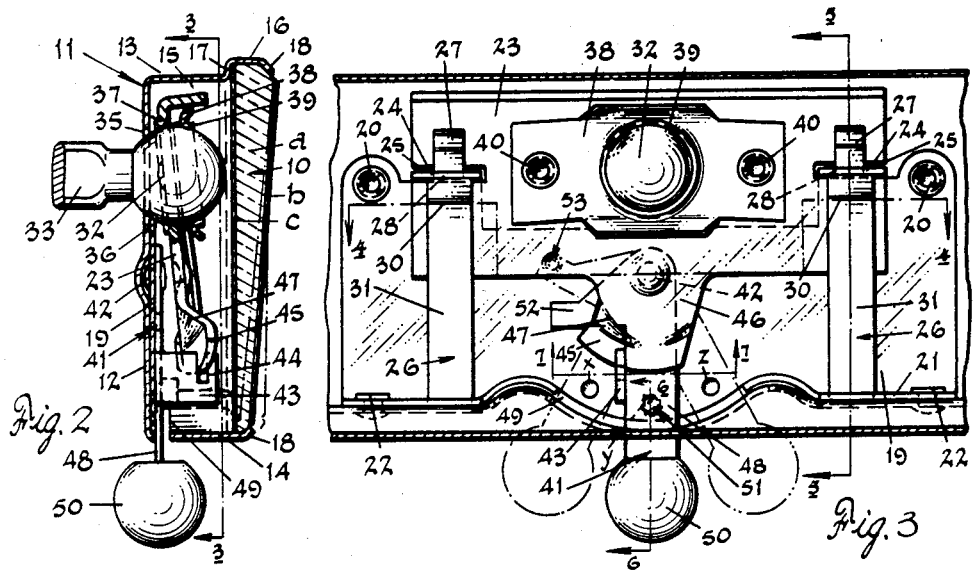
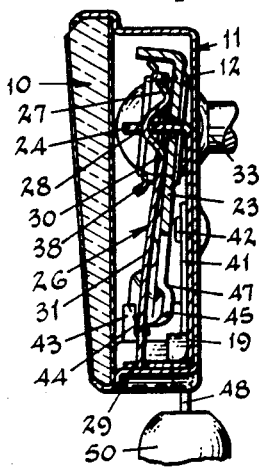
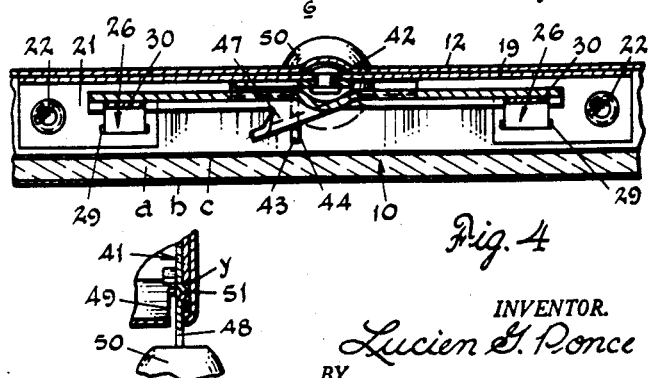
INVENTOR.
Lucien G. Ponce
BY Nobbe & Swope
ATTORNEYS July 15, 1958     L. G. PONCE     2,843,017
REAR VIEW MIRROR ASSEMBLY
Filed Dec. 7, 1954     2 Sheets—Sheet 2
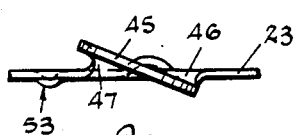
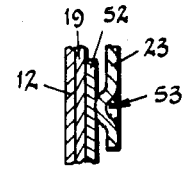
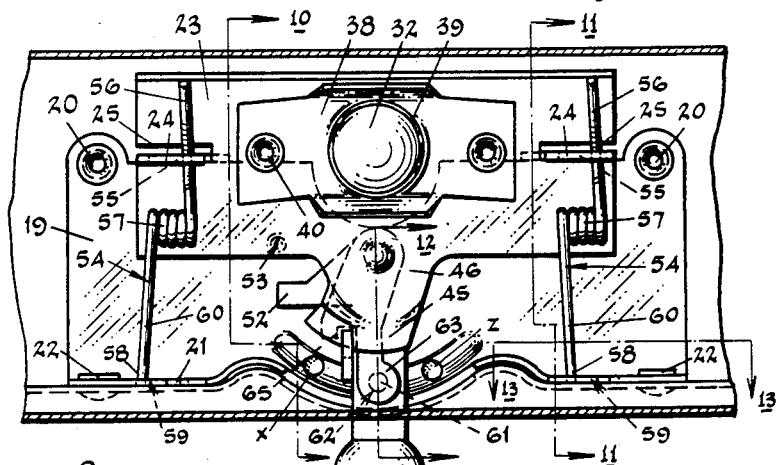
INVENTOR.
Lucien G. Ponce
BY Nobbe & Swope
ATTORNEYS

United States Patent Office 2,843,017
Patented July 15, 1958

2,843,017

REAR VIEW MIRROR ASSEMBLY

Lucien G. Ponce, Weirton, W. Va., assignor to Libbey-Owens-Ford Glass Company, Toledo, Ohio, a corporation of Ohio Application December 7, 1954, Serial No. 473,550

7 Claims. (Cl. 88—77)

The present invention relates to improvements in rear view mirrors for automobiles and the like.

The primary purpose in the use of a rear view automobile mirror is of course to provide the driver with a satisfactory view of the rear road under the various conditions of driving. For example, in Patent No. 2,631,498, issued March 17, 1953, to Dwight W. Barkley there is disclosed a prismatic rear view mirror which provides the automobile driver with a personal selection of three or more intensities of images of the rear road conditions. Such a mirror permits the driver to make a choice of images of various brightness, each image being of the common limited rear field of view so as to obtain maximum visibility with the minimum glare best suited to his particular personal eye glare tolerance and visual acuity under all the varying light intensities present under modern night and day driving conditions.

In the above patent, the choice of image intensity suitable to the driver is made by his selectively positioning the prismatic rear view mirror by angular adjustment to alternately locate the various images of differing intensities of the same limited common rear field of view in the normal line of sight of the driver as he sits in driving position in the car. Thus, the rear view mirror provides a choice of at least three image intensities which may be, for example, of over 30% for normal day driving, between 10% and 30% approximately for normal night driving, and of 4.5% up to 12% approximately for abnormal glare driving conditions, of the incident light falling upon the rear view mirror and coming from the rear view of the road, etc.

An important object of this invention is the provision of a prismatic rear view mirror of the general type disclosed in the above patent embodying novel and improved means for mounting and angularly adjusting the mirror to predetermined positions to selectively locate any one of three different image intensities of the same limited common rear field of view in the normal line of sight of the driver.

Another object of this invention is the provision of such a rear view mirror embodying simple yet effective means by which the driver may angularly adjust the mirror to predetermined positions at will to selectively locate in the predetermined position of the driver's eyes the first, second and third images of the common rear field of view.

Another object of the invention is the provision of such a rear view mirror which can be readily and conveniently tilted upwardly and downwardly by the driver within a controlled arc to bring any one of the three images of various intensities into the line of vision of the driver, and including means for insuring maintenance of the mirror in selected position.

A further object of the invention is the provision of such a rear view mirror embodying means enabling tilting movement of the mirror to any one of three positions by finger tip control to give the desired intensity of image, without disturbing the adjustment of the mirror in relation to the driver, and for effectively maintaining the mirror in selected position.

A still further object of the invention is the provision of cam actuated means by which shifting of the mirror to its different positions may be easily and quickly effected with a minimum of effort and attention on the part of the driver, together with means coacting with said actuating means for positively locating the mirror in its selected position and for preventing accidental displacement therefrom.

Other objects and advantages of the invention will become more apparent during the course of the following description when taken in connection with the accompanying drawings.

In the drawings wherein like numerals are employed to designate like parts throughout the same:

Fig. 1 is a perspective view of a rear view mirror constructed in accordance with the invention;

Fig. 2 is a vertical sectional view taken substantially on line 2—2 of Fig. 1;

Fig. 3 is a fragmentary vertical sectional view taken substantially on line 3—3 of Fig. 2;

Fig. 4 is a fragmentary horizontal sectional view taken substantially on line 4—4 of Fig. 3;

Fig. 5 is a detail sectional view taken substantially on line 5—5 of Fig. 3;

Fig. 6 is a fragmentary detail sectional view of the actuating means for the mirror taken substantially along line 6—6 of Fig. 3;

Fig. 7 is a fragmentary view of the cam plate used in the invention taken substantially along line 7—7 of Fig. 3;

Fig. 8 shows the relationship between the detent and the finger of the actuating arm in the daylight position of the mirror;

Fig. 9 is a fragmentary front elevation of a modified form of the invention;

Fig. 10 is a sectional view taken substantially along line 10—10 of Fig. 9;

Fig. 11 is a sectional view taken substantially along line 11—11 of Fig. 9 showing an alternate embodiment of the spring means used in the invention;

Fig. 12 is a detailed sectional view taken along line 12—12 of Fig. 9 showing an alternate method of locating and yieldably retaining the mirror in the proper reflective position; and Fig. 13 is a fragmentary sectional view taken substantially along line 13—13 of Fig. 12 showing a means of retaining the alternate embodiment of the spring means in position.

With reference now to the drawings, there is disclosed a mirror element 10 which comprises a support body *a* of glass or other transparent material which is wedge shaped in vertical cross section and is provided with front and rear reflecting surfaces *b* and *c* respectively in the form of coatings arranged one behind the other, with either their lower or upper edges in converging relationship and with the other edges more widely spaced apart. Thus, the mirror reflective means or coatings may be arranged upon a prism which may be of glass or plastic and disposed in non-parallel relationship or upon sheets of the same arranged in prism form.

The angle between the two mirror reflective coatings *b* and *c* which form a front mirror and a rear mirror is preferably of the order of three and one-fourth degrees, although, there may readily be used an angular separation between the two mirrors of from two to ten degrees or more, the larger angular separation of close to ten degrees being preferable when a prism composed of glass sheets is used.

By way of example, the back surface of the support body *a* may carry a highly reflective mirror film *c* which, as a coating on a plane sheet of glass, would have a reflectivity preferably ranging from 50% to 95% or more and which is preferably opaque. On the other hand, the front surface of the support body may carry a reflective film means $b$ which is preferably semi-transparent, of substantially no light absorption, and has a reflectivity of 10% to 30% for use in normal night driving and in daytime driving under snow and sun glare conditions.

According to the invention, the mirror element 10 is carried by a substantially rectangular housing or case 11 having a back wall 12, top wall 13, bottom wall 14 and opposite end walls 15. The case is open at the front and has a forwardly directed peripheral flange 16 therearound which overlays the edges of the mirror element and serves to hold it rigidly in position to close the front of the case. As will be seen in Fig. 2, the flange 16 includes a substantially vertical wall portion 17 which engages the rear surface of the mirror element to hold it against rearward displacement, and a bent forward edge portion 18 which engages corresponding beveled edge portions of the mirror element to hold it against forward displacement.

The case 11 is carried by a mounting plate 19 which is suitably secured to the back wall 12 of the case by rivets or the like 20. The mounting plate is provided along its lower edge with a forwardly directed flange 21 conforming to the bottom wall 14 of the case and secured thereto by rivets or the like 22. The mounting plate 19 is hingedly connected to a substantially vertical stationary support plate 23, which is disposed in front of and spaced from said mounting plate. More particularly, there is provided at the upper edge of the mounting plate spaced, forwardly bent tabs 24 which are received in horizontal slots 25 at the opposite ends of the support plate 23 whereby the mounting plate 19, and case 11 attached thereto, are pivotally carried by the support plate 23. The tabs 24 are maintained in position in the slots 25 of the support plate by means of leaf springs 26 provided at the upper ends with ears 27 which extend through slots 28 formed in the tabs 24 of mounting plate 19. The lower ends of the springs 26 are held in slots 29 formed in the forwardly directed flange 22 of the mounting plate 19, while each spring is formed adjacent its upper end with a kinked portion 30 bearing against the support plate 23.

Thus, as best seen in Figs. 2 and 8, the ears 27 of leaf springs 26 serve to prevent the tabs 24 from sliding out of engagement with the slots 25 of the support plate 23, and by virtue of the kinked portion 30 and bowed portion 31, the spring acts to bias the lower portion of the mounting plate 19 forwardly toward the lower portion of the support plate 23. In other words, the tabs 24 bear upon the bottoms of the slots 25 which constitute the hinge points about which the mounting plate can be rocked to enable tilting of the case and the mirror carried thereby as a unit upwardly and downwardly relative to said stationary support plate to obtain the desired image intensity.

The stationary support plate 23 is carried by a truncated ball 32, provided at the outer end of a supporting arm 33, the opposite end of which terminates in a threaded stud or the like 34 by which the mirror may be fixedly secured to the automobile.

The ball 32 extends through an opening 35 in the back wall 12 of case 11 and through a complementary opening 36 in mounting plate 19, being secured in a spherical seat or bearing 37 in the support plate 23 by means of a metal strap 38 having a bearing portion 39 conforming to and engaging said ball. The opposite ends of the strap 38 are secured to the support plate 23 by rivets or the like 40. In use, the support plate 23 and strap 38 coact to grip the ball 32 with sufficient pressure to maintain the said support plate stationary except when it is desired to adjust the mirror assembly bodily with respect to said ball to position the mirror for different drivers.

The desired tilting of the mirror 10 is effected by an actuator arm 41 arranged within the case 11 in front of the mounting plate 19 and pivoted thereto as at 42. More particularly, the actuator arm 41 is provided with a bar portion 43 having a slot 44 therein struck upwardly intermediate its length. Received within the slot is a cam plate 45 which is carried at the lower end of a leg 46 depending from the support plate 23. Specifically, the cam plate 45 is twisted or turned with respect to the leg 46 as at 47 so as to give the proper cam or torque effect when actuator arm 41 and slot 44 are moved relative thereto.

The lower portion 48 of the actuator arm 41 extends through aligned slots 49 formed in the bottom flange 22 of the mounting plate 19 and bottom wall 14 of the case and carries at its lower end outwardly of the case a knob or finger engaging member 50. Struck rearwardly from the actuator arm 41 along the lower portion thereof 48 is a convex projection or protuberance 51 adapted to be selectively received within the depressions or dimples $x$, $y$, and $z$ provided in the mounting plate 19.

The depressions $x$, $y$ and $z$ are arranged in an arcuate path so that as the actuator arm 41 is swung about its pivot 42, the protuberance 51 passes successively from the depression $x$ into the depression $y$ and then into the depression $z$. During this movement of the actuator arm 41, the cam plate 45 rides in the slot 46 of the bar portion 43 and thus causes the mounting plate 19 to which the actuator arm 41 is secured to pivot away from the support plate 23 to move the case 11 and mirror 10 associated therewith to one of the three reflective positions ($x$, $y$ and $z$) mentioned hereinabove and indicated by the solid and phantom lines in Fig. 2. When the mirror and case have been located in the desired reflective positions, they are maintained in such position by the cooperation of the protuberance 51 and the depressions $x$, $y$ or $z$ which yieldably restrain movement of the actuator arm 41. To assure that the actuator arm has sufficient bearing surface upon the mounting plate 19 so that it will not be caused to cock or pivot in a direction other than that provided by the pivot 42, a finger 52 is provided thereon adjacent the pivot 42 and is adapted to slide on the mounting plate 19. In the daylight position of the mirror, indicated by the letter $x$, the finger 52 slides under a detent 53 (Figs. 3 and 8) formed in support plate 23 which frictionally engages the said finger and aids in retaining the actuating arm in the daylight position. As an additional function, the detent 53 when in engagement with the finger 52 also serves to add rigidity to the mounting plate 19 and the support plate 23 when the case is bodily adjusted about the ball 32.

An alternate embodiment of the invention is shown in Figs. 9 to 13 which differs principally from the embodiment shown in Figs. 1 to 8 by using different type springs to bias the lower part of the mounting plate and case toward one another. These springs, designated by the numeral 54, extend through openings 55 provided in the tabs 24 and have their upper ends 56 bent or kinked and in contact with the support plate 23. Each spring is coiled midway along its length as at 57 and bears against the support plate 23, while the lower ends 58 of the springs are held in slots 59 (Fig. 13) formed in the forwardly directed flange 22 of the mounting plate 19.

Thus, as best seen in Figs. 9 and 11, the upper kinked ends of the springs 54 serve to prevent the tabs 24 from sliding out of engagement with the slots 25 of the support plate 23, and by virtue of the coils 59 and bowed portions 60, the springs act to bias the lower portion of the mounting plate 19 forwardly toward the lower portion of the support plate 23. In other words, the tabs 24 bear upon the bottoms of the slots 25 which constitute the hinge points about which the mounting plate can be rocked to enable tilting of the case and mirror carried thereby as a unit relative to the stationary support plate to obtain the desired image intensity.

To further aid in locating the mirror in the desired reflective position, there is provided in this embodiment of the invention a spring loaded ball 61 (Fig. 12) which is adapted to be selectively received within the depressions or dimples $x$, $y$ and $z$ provided in the mounting plate 19. As may best be seen in Fig. 12 the ball 61 is carried in an opening 62 provided in the actuator arm 41 and is yieldably urged toward the mounting plate by a spring retainer clip 63 carried by the pivot 42. The retainer clip 63 is notched as at 64 to engage the bar portion 43 of the actuator arm 41 to retain the said clip in the proper position with respect to the ball 61. In other words, as the actuator arm 41 is moved, the bar 43 engages the slotted portion 64 of the clip 63 and moves the clip about pivot 42 so that both the ball and clip move with the actuating arm 41 thus enabling the ball 61 to yieldably engage one of the depressions $x$, $y$ or $z$.

When using either embodiment of the invention described above, the case 11 and the support plate 23 are first bodily adjusted by the driver upon the supporting ball 32 to the proper angular position for the driver of the automobile. Having adjusted the mirror to the proper angular position, the mirror element 10 may be tilted by rocking the mounting plate 19 relative to the support plate 23 to selectively bring any one of the three reflective light beams to the driver's eyes. This tilting of the mirror can be easily and quickly effected by the driver by simply engaging the knob 50 to swing the cam actuating arm 41 in the desired direction to move the cam protuberance 51 or spring loaded ball 61 to engage the desired depressions $x$, $y$ or $z$ depending upon the requirements of the driver. For example, when the protuberance 51 or the ball 61 engages depression $x$, the mirror is in its normal day driving position. However, when it is desired to change the mirror to the normal night driving position, the protuberance or ball is moved to depression $y$, and for driving under abnormal glare conditions into depression $z$. It will be apparent that while this tilting of the mirror is taking place, the position of the mirror case upon the ball 32 will not be affected as it is held in a stationary rigid preadjusted position by frictional engagement of the strap 38 with the ball 32.

While the mirror mounting described herein provides for the adjustment of the mirror element to give three different light intensities of images of the road to the rear of the automobile, it will be evident that this mounting may also be used to support and adjust a two position mirror.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a rear view mirror device for automobiles providing a selection of at least two different reflectivities, a support plate, a housing surrounding said support plate, said housing having a back wall and being open at the front thereof, a mirror element carried by said housing and closing the front of said housing, a mounting plate attached to said housing, means carried by said mounting plate for hingedly mounting said housing on said support plate, means carried by said support plate for attachment for an automobile, cam means carried by said support plate, actuating means mounted on said mounting plate and engageable with said cam means for tilting said housing and mirror element stepwise as a unit to different angular locations relative to said support plate to bring the mirror surfaces to predetermined selected positions to reflect to the same point images of different intensities, and positioning means provided on said mounting plate for maintaining said housing and mirror element in adjusted tilted position, said positioning means including a plurality of depressions in said mounting plate, said actuating means being provided with engaging means for selectively engaging said depressions to maintain the mirror and housing in its predetermined selected position.

2. A rear view mirror device for automobiles as described in claim 1, in which said engaging means on said actuating means for selectively engaging said depressions includes a ball, and means for urging said ball towards said mounting plate and said depressions.

3. In a rear view mirror device for automobiles providing a selection of at least two different reflectivities, a support plate, a housing surrounding said support plate, said housing having a back wall and being open at the front thereof, a mirror element carried by said housing and closing the front of said housing, a mounting plate attached to said housing, means carried by said mounting plate for hingedly mounting said housing on said support plate, said means including forwardly bent tabs on said mounting plate which are received within slots in said support plate, said tabs serving to hingedly support said mounting plate and housing on said support plate by bearing upon the bottoms of said slots, means carried by said support plate for attachment to an automobile, cam means carried by said support plate, and actuating means mounted on said mounting plate and engageable with said cam means for tilting said housing and mirror element stepwise as a unit to different angular locations relative to said support plate to bring the mirror surfaces to predetermined selected positions to reflect to the same point images of different intensities.

4. In a rear view mirror device for automobiles providing a selection of at least two different reflectivities, a support plate, a housing surrounding said support plate, said housing having a back wall and being open at the front thereof, a mirror element carried by said housing and closing the front of said housing, a mounting plate attached to said housing, means carried by said mounting plate for hingedly mounting said housing on said support plate, means carried by said support plate for attachment for an automobile, cam means carried by said support plate, actuating means mounted on said mounting plate and engageable with said cam means for tilting said housing and mirror element stepwise as a unit to different angular locations relative to said support plate to bring the mirror surfaces to predetermined selected positions to reflect to the same point images of different intensities, and engaging means provided on said actuating means for positively engaging said cam means, said engaging means including a slot in said actuating means in which said cam is received.

5. In a rear view mirror for automobiles, a case having a back wall and an opening in the front thereof, a mirror element secured in said opening and spaced from said back wall, said mirror element serving to reflect images of different intensities when moved with respect to the object being reflected and having front and back surfaces which are disposed at an angle to one another, with a mirror coating being provided on at least said back surface, a support plate within the case between said back wall and said mirror element and spaced from said mirror element, means carried by the support plate to connect said plate to an automobile, a mounting plate within the case between said back wall and said support plate and attached to said case, means pivotally attaching said mounting plate to said support plate, a leg member extending from said support plate, cam means depending from said leg member, said cam means comprising a twisted plate which is turned laterally out of the plane of said leg portion, and actuating means movably carried by said mounting plate, said actuating means having a slot therein positioned so as to receive a portion of said twisted plate in said slot during movement of the actuating means relative to said twisted plate, said actuating means being mounted for movement in an arcuate path which is substantially parallel to the plane of said mounting plate so as to coact with said twisted plate to tilt said case and mirror element stepwise as a unit relative to said support plate to different angular locations about said pivotal attaching means to bring the mirror surfaces to definite selected positions to reflect to the same point images of different intensities.

6. In a rear view mirror for automobiles, a case having a back wall and an opening in the front thereof, a mirror element secured in said opening and spaced from said back wall, said mirror element serving to reflect images of different intensities when moved with respect to the object being reflected and having front and back surfaces which are disposed at an angle to one another, with a mirror coating being provided on at least said back surface, a support plate within the case between said back wall and said mirror element and spaced from said mirror element, means carried by the support plate to connect said plate to an automobile, a mounting plate within said case and attached thereto, means pivotally attaching said mounting plate to said support plate, a leg member extending from said support plate, a cam plate depending from said leg member in a substantially twisted plane which is turned relative to the plane of said leg member, an actuator arm member pivotally mounted on said mounting plate, and means provided on said actuator arm member for positively engaging said cam plate during movement of the actuator arm member relative to said leg member, said means comprising a bar portion having a slot therein for receiving said cam plate, said actuator arm member being mounted for movement in a plane that is substantially parallel to the plane of said mounting plate so as to coact with said cam plate and thereby tilt said case and mirror element stepwise as a unit relative to said support plate to different angular locations about said pivotal attaching means to bring the mirror surfaces to definite selected positions to reflect to the same point images of different intensities.

7. In a rear view mirror for automobiles, a case having a back wall and an opening in the front thereof, a mirror element secured in said opening and spaced from said back wall, said mirror element serving to reflect images of different intensities when moved with respect to the object being reflected and having front and back surfaces which are disposed at an angle to one another, with a mirror coating being provided on at least said back surface, a support plate within the case between said back wall and said mirror element and spaced from said mirror element, means carried by the support plate to connect said plate to an automobile, a mounting plate attached to said case, means pivotally attaching said mounting plate to said support plate, a leg member extending from said support plate, cam means depending from the lowermost marginal edge of said leg member, said cam means comprising a plate integral with said leg member and twisted relative thereto whereby the lower edge of said plate defines a cam surface, and actuating means movably carried by said mounting plate, said actuating means comprising a downwardly extending arm provided with a bar portion extending therefrom, said bar portion having a slot therein struck upwardly intermediate its length to receive a portion of said cam surface in said slot during movement of the arm relative to said cam surface, said arm being mounted for movement in a path which is substantially parallel to the plane of said mounting plate whereby said slot coacts with said cam surface to tilt said case and mirror element stepwise as a unit relative to said support plate to different angular locations about said pivotal attaching means to bring the mirror surfaces to definite selected positions to reflect to the same point images of different intensities.

References Cited in the file of this patent
UNITED STATES PATENTS

| | | |
|---|---|---|
| 2,052,770 | Hofer | Sept. 1, 1936 |
| 2,420,259 | McNamara | May 6, 1947 |
| 2,469,207 | Roedding | May 3, 1949 |
| 2,504,386 | Brady | Apr. 18, 1950 |
| 2,588,792 | Barkley | Mar. 11, 1952 |